US007924835B2

(12) United States Patent
Platnic

(10) Patent No.: US 7,924,835 B2
(45) Date of Patent: Apr. 12, 2011

(54) METHOD AND DEVICE FOR PROVIDING MULTICAST SERVICES TO MULTIPLE CUSTOMERS

(75) Inventor: Michel Platnic, Ramat Gan (IL)

(73) Assignee: ECI Telecom Ltd, Petach Tikva (IL)

( * ) Notice: Subject to any disclaimer, the term of this patent is extended or adjusted under 35 U.S.C. 154(b) by 528 days.

(21) Appl. No.: 11/816,444

(22) PCT Filed: Feb. 16, 2006

(86) PCT No.: PCT/IL2006/000200
§ 371 (c)(1),
(2), (4) Date: Aug. 16, 2007

(87) PCT Pub. No.: WO2006/092778
PCT Pub. Date: Sep. 8, 2006

(65) Prior Publication Data
US 2008/0144622 A1    Jun. 19, 2008

(30) Foreign Application Priority Data
Mar. 1, 2005    (IL) .......................... 167180

(51) Int. Cl.
H04L 12/28    (2006.01)
H04L 12/56    (2006.01)
(52) U.S. Cl. .................. 370/390; 370/216; 370/248
(58) Field of Classification Search .................. 370/390
See application file for complete search history.

(56) References Cited

U.S. PATENT DOCUMENTS
5,812,552 A    9/1998    Arora et al.
6,816,966 B1    11/2004    Gupta et al.
2002/0021662 A1*    2/2002    Heyningen et al. ........... 370/219
2002/0110245 A1*    8/2002    Gruia ........................... 380/278
2002/0150097 A1*    10/2002    Yen et al. ...................... 370/390
2003/0125040 A1    7/2003    Walton et al.
2004/0120326 A1*    6/2004    Yoon et al. ............... 370/395.53

(Continued)

FOREIGN PATENT DOCUMENTS
TW    200302642 A    8/2003

OTHER PUBLICATIONS
"RFC 2236 (RFC2236)" RFC 2236—Internet Group Management Protocol, Version 2, W. Fenner Xerox PARe; Copyright (C) The Internet Society (1997). All Right Reserved. Nov. 1997.

(Continued)

Primary Examiner — Daniel Wu
Assistant Examiner — Frederick Ott
(74) Attorney, Agent, or Firm — Browdy and Neimark, PLLC

(57) ABSTRACT

A method of multicast transmission in a communication network by using IGMP protocol, to a plurality of IGMP-equipped hosts serving end customers of the network, the method comprises:—using IGMP protocol to request receipt of information along a multicast channel, by a particular end customer;—adding the end customer to a multicast group including, upon adding said particular end customer, at least one of the end customers;—delivering information along the multicast channel to the end customers belonging to the multicast group, and in response to the request, ensuring for the particular end customer access to information delivered along the multicast channel by transmitting to that end customer access data, which includes: churning information indicative of a multicast churning key and/or service information, and/or a combination thereof.

18 Claims, 5 Drawing Sheets

U.S. PATENT DOCUMENTS

2004/0133920 A1* 7/2004 Kim et al. .................... 725/129
2008/0144622 A1* 6/2008 Platnic .......................... 370/390

OTHER PUBLICATIONS

Thomas Hardjono et al., "The multicast Group Security Architecture; draft-ietf-msec-arch-05.txt;", IETF Standard-working-Draft, Internet engineering task force, IETF, CH, vol. msec, No. 5, Jan. 2004.

Cain Cereva Networks S. Deering et al., "Internet Group Management Protocol, Version 3; rfc3376.txt" IETF Standard, Internet Engineering Task Force, IEFT, CH, Oct. 2002.

* cited by examiner

| CUSTOMER | ONT | ENTITLED TO MULTICAST | ENTITLED TO CHANNELS NUMBERS | NUMBER OF MAX SIMULTAN CHANNELS | MAX SIMULTAN BW |
|---|---|---|---|---|---|
| 1 | ONT1 | YES | 1,2,3,6 | $P_1=3$ | 10 mb/s |
| 2 | ONT2 | YES | 1,2,3,4,5,6 | $P_2=$UNLIMITED | UNLIMITED |
| n | ONTn | YES | 1,2,3,4 | $P_n=1$ | 3.3 mb/s |

*FIG. 4*

METHOD AND DEVICE FOR PROVIDING MULTICAST SERVICES TO MULTIPLE CUSTOMERS

FIELD OF THE INVENTION

The invention relates to a method and a system for delivering multicast services such as video to multiple clients by multicasting, where the services are preferably delivered from a central unit (Optical Line Termination) through a passive optical network (PON) to Optical Network Terminals or Optical Network Units respectively associated with the clients (customers).

BACKGROUND OF THE INVENTION

The well known and widely used Internet Group Management Protocol (IGMP) is used by IP hosts to report their multicast group memberships to any immediately neighboring multicast routers.

For example, in the IGMP version 2 (RFC 2236), messages are encapsulated in IP datagrams, comprising at least the type of message and a group address. The group address identifies a multicast channel and is to be understood as the IP multicast group address of the group being reported or left. The IGMP version 2 protocol includes mainly three types of messages in the host-router interaction; 1) a membership query message sent from the router to hosts, 2) a membership report message such as an IGMP "join group" message sent from a host to the router, and 3) an IGMP "leave group" message sent from a host to the router.

The IGMP protocol enables every one of the hosts to request delivery of any multicast channel available from the IGMP router by sending a "join group" message to the router and indicating the channel. The IGMP router registers the host as a member of the IP group and then the host is provided with the channel that has been ordered. It should be noted that in addition to this newly ordered channel, the subscriber unit may receive all the channels ordered by other members of the same IGMP network.

IGMP protocol is a straightforward way of serving multiple subscribers within a passive optical network (PON) that provides multicast services. The customers of PON are usually associated with so-called Optical Network Units ONUs (or Optical Network Terminations ONTs). The OLT (Optical Line Termination) is usually situated in a central office. In the rest of the document, ONT should be understood as either ONT or ONU.

In the case where the OLT comprises an IGMP router, the OLT is in charge of collecting part/all of the IGMP requests from the customers joining a group (as in the conventional IGMP protocol), to figure up which multicast channels are to be delivered to the ONTs. For example, a multicast channel can be ordered by a customer via a remote control unit associated with a Set Top Box (STB) of the customer's TV receiver. The STB cooperates with a corresponding ONT. Upon receiving an IGMP request from one of the customers, OLT transmits the ordered multicast channel downstream, via the PON interface. Each multicast channel is sent by OLT to all members of the IGMP network. The IGMP network may include from 1 to n hosts. Usually n doesn't exceed the maximum number of ONTs where each ONT includes only one IGMP host.

At the PON physical layer, all the information is shared between all ONTs. This fact is due to the physical characteristics of the PON. In order to prevent end-customers to access information not dedicated to them, unicast traffic is usually churned (scrambled) by using a unicast churning function. But such a function is not provided at the PON level for multicast streams. This function, where a key is shared between the OLT and the ONT, can not be used for multicast services where the encryption should be applied per channel or per group of channels. In other words, if a customer served by a specific ONT orders a multicast channel—the ordered channel can be potentially received by all the ONTs of the same PON even if some of these customers are not entitled to see the channel.

A known multicast encryption key exchange method disclosed in a publication US20020150097 comprises selecting/generating a multicast encryption key from among the churning keys belonging to the network devices, and periodically updating the key by delivering to the network devices the difference values between the updated multicast encryption key and the respective churning key of each network device. The process, for the ONT to get the churning key, requests an exchange of several messages between the OLT and ONT and vice-versa. It may become impossible to deliver the encryption/churning information fast enough to the ONT of the customer that just requested a new channel in case the churning key in not known previously by the ONT. In addition, an end multicast customer's ONT may require some service information to access and transmit the multicast channel to the customer (for example, to reserve bandwidth required for the channel's reception and/or transmission to the end equipment though the home network).

OBJECT AND SUMMARY OF THE INVENTION

It is therefore an object of the invention to provide a method and a system enabling multicast transmission of multicast services in a communication network, for example comprising a PON (passive optical network), and with various levels of security.

The above object can be achieved by providing a method of multicast transmission in a communication network by using IGMP protocol, to a group (plurality) of hosts each associated with an IGMP host to serve respective end customers of the communication network, the method comprises:
  using IGMP protocol to request receipt of information along a multicast channel, by a particular end customer,
  adding said customer to a multicast group including, upon adding said particular end customer, at least one of the end customers,
  delivering information along said multicast channel to the end customers belonging to said multicast group, and
  in response to said request, ensuring for said particular end customer access to information delivered along said multicast channel by transmitting to said particular end customer access data including at least one kind of information selected from among: churning information indicative of a multicast churning key if used, service information for assisting receipt of information along said multicast channel by said end customer, and any combination thereof.

Those skilled in the art understand that the number of members in the multicast group may be equal to or less than the number of hosts serving the respective end customers in said plurality.

The communication network preferably comprises a passive optical network (PON). The step of requesting (zapping) the multicast channel is preferably performed by using IGMP protocol in the PON.

The PON may be, for example, an ATM-based PON (APON, BPON, specific types of GPON) or an Ethernet-based PON (EPON).

The step of delivering the multicast channel is performed with the aid of the IGMP router. The IGMP router can be part of OLT (Optical Line termination) or can be located in the core network communicating with the OLT (the network "feeding" the OLT).

The host comprises equipment serving an end customer and located at or in proximity to the customer's premises. The IGMP host can be located either in a Set Top Box (STB) situated at the end-customer's premises, a personal computer (PC), at the Optical Line Termination (ONT, can be also ONU), or both in the STB and ONT, in this case the ONT is an IGMP proxy.

Optical Line Termination OLT and Optical Network Termination ONT should be understood as defined in ITU-T Recommendations G.983.1 (ATM-PON) and ITU-T G.984.1 (Gigabit-capable Passive Optical Networks).

Most commonly, the multicast channels are video channels; each of the ONTs is connected to at least one TV Set Top Box (STB) or any other system capable of decoding video streams. When the corresponding end customer requests a channel, the mentioned IGMP message is initiated from the corresponding STB or PC via the ONT.

The step of requesting a channel (a zapping request) is preferably performed by sending an IGMP message (request) from an IGMP host, serving said particular end customer and located at the customer premises, to an IGMP router located either at OLT or any other entity communicating directly or indirectly with the OLT, and the request indicates said requested multicast channel to be delivered to the particular end-customer.

In one preferred version of the above method (according to a first aspect of the invention), the step of ensuring the access to the particular end customer comprises sending a code key message from said OLT to the particular ONT in response to said IGMP request, wherein the code key message comprises said access data including the service information for adapting said ONT to access said multicast channel and transmit it to the end user.

The service information preferably concerns type and/or format of the service delivered via the requested multicast channel.

In another preferred version of the above method, according to the second aspect of the invention, the delivering step is performed with preliminary churning said multicast channel using a multicast churning key, and preferably, if the particular end customer is entitled to access said multicast channel, the step of providing the access to the particular end customer comprises sending a code key message from said OLT to the particular ONT in response to said IGMP request, the code key message comprising said access data that includes the churning information being information about said multicast churning key, for further dechurning said requested multicast channel.

In accordance with said second aspect of the invention (that comes as an alternative or an addition to the first aspect) each of the ordered multicast channels is churned for transmission by using a churning key (multicast churning key) specific for that channel or for a group of channels.

Dechurning of the data received via such a multicast channel is then performed by data unscrambling at the ONT using the churning information that is received from the OLT in the frame of the access data being part of the code key message.

Examples of the ways to use the churning information for revealing the churning key will be described further below.

In the proposed method, the churning key (i.e., the multicast churning key) is provided per channel or per package (group of channels), thus to allow controlling entitlements at a channel or a package level. If a channel is not presently requested, the churning information is unknown to the ONT. Therefore, when requesting a new channel, the ONT should receive the churning information as fast as possible so as not to increase the zapping time.

The mentioned IGMP request format can be for example a "membership report" as described in the IGMP version 2 standard which is also called IGMP "join a group" message. Other versions of the IGMP standard are also relevant, for example the IGMP version 3 with its membership report message.

The requested multicast channel is indicated in the IGMP request by the IP multicast address of the channel.

In case IGMP version 3 (described in RFC 3376) is used, the IGMP request may optionally comprise an additional information voluntary inserted at and sent from the ONT upstream to the OLT during the zapping request. The use of the additional information will be described as the description proceeds.

According to the first aspect of the invention, the multicast transmission can be ensured by providing to the end customer that has requested the channel, access data comprising the service information concerning service type/format of the multicast channel. In a PON communication system where ONTs serving end customers are not pre-provisioned and/or adapted to independently find/determine service information for configuring of the home network (using, for example, HPNA 3.0), the mentioned method of multicast transmission (according to the first aspect of the invention) can be considered to have a certain level of security (or access control). In other words, only the ONT that ordered the multicast channel will receive the service information. Such service information essentially improves quality of service within the home network where several services are supported/transmitted simultaneously, for example voice, video and data.

Based on the service information received within the code key message, the ONT serving the end customer that has requested the multicast channel will then perform self-configuring to access the delivered service and transmit it to the end customer.

The Service Information may comprise various fields that can be sent within the code key message, usually (but not obligatory) in addition to fields comprising indications of VP/VC, Port-ID, MAC address range, IP address range—together or separately. The VP/VC data is usually utilized for ATM-based PON communication systems.

MAC addresses, IP addresses (or address ranges) are used in Ethernet, ATM or IP networks.

OLT may receive the service information, to be transmitted to ONT, from various external entities in the PON communication system.

At least one of the service information fields (the non-exhausting list of which follows below) may be present within the code key message at the same time. The service information provides data to help delivering multiple high-speed real-time audio and video data streams without disruption in addition to "best effort" data". The QoS features allow assignment of specific time slots for each stream of data guaranteeing that the real-time data will be delivered when it is required with predetermined latency and without interruption. The protocol used can be HPNA.3, wherein HPNA is Home Phoneline Networking Alliance.

Service type field (for example, 8 bits for encoding the following services):
Video, video conferencing, radio, voice conferencing.
Traffic type field (for example, 3 bits):
In case of ATM based PON, the field may be equivalent to Class of Service (CoS) and means one of the traffic types/classes of service: CBR, VBRreal-time, VBRnone-real-time, UBR+, UBR. However, the traffic type encoded in the field could be also: real-time, non real-time, best effort.
Service Priority (for example, 3 bits):
May be used for home networking (example: with HPNA 3.0) for service priority classification.
For example, the ONT should immediately know the service priority of the received multicast channel, since the new multicast service, with its class of service, should not interfere with more sensitive (preferred) services such as voice, voice conferencing, and other delay critical services.
Data Rate (for example, 16 bits):
Indicates rate in kb/s; The indication can be, for example, "max", "min", "average rate".
Can be used for home gateway bandwidth reservation, for example if used together with HomePNA 3.0, and is usually received with the priority service information.
Flow ID
Flow identifier, for example, the multicast channel number.
The Flow ID may replace indications of the VP/VC, Port ID, MAC or IP (i.e., the Flow ID indication may be sufficient to identify the multicast channel).
Max Latency/Jitter
Maximum jitter and latency bounds, can be used for management of access buffers and priority management.
BER
Bit Error Rate indication.

Coming back to the ways of multicast transmission in a PON communication system, we will now discuss yet additional security levels that can be provided both for the first and the second main embodiments of the invention.

Additional security levels of the discussed multicast transmission can be achieved by protecting the access data, for example by encrypting at the OLT the access data or portion thereof for further decrypting at the ONT.

Taking into account that the access data comprises the churning information and/or the service information, the total access data can be encrypted by using one of the various encryption/decryption algorithms, for example a DES algorithm, a 3DES algorithm, an AES algorithm and RSA algorithm.

Alternatively, the encryption could be done by using information shared by both the ONT and OLT at a specific moment of time for encrypting at least a portion of the access data. This shared information may be the MAC address of the ONT, its IP address if it exists, a registration number or any other information or combination of information known at a specific moment by both the ONT and the OLT. As an answer to a zapping request, the OLT may use this shared information to encrypt the access data by transmitting to the ONT, for example, only the difference between the shared information and intended content of all or some fields of the access data. Operations more complex or simple than the subtraction may also be used to encrypt the access data at the OLT, and then to decrypt it at the suitable ONT.

Yet another possibility can be that the ONT sends a random number to the OLT during the zapping request itself, so that the OLT can use this information instead of the 'shared information' described above. Sending this random number is possible, for example, when using IGMP version 3 for the request and utilizing the Auxiliary Data part of the Group Record of the IGMP version 3 "membership report message".

During zapping, the method proposes to transmit the access data (comprising the service information and/or the churning information) from the OLT to the ONT using several options depending mainly on the fact that the channel transporting the information is secured or not.

The code key message can be transmitted to the particular end customer by using a unicast (churned or non-churned) connection.

Any time when the word "multicast" or "unicast" is used, it should be understood that it relates to layer 2 (presented here as ATM or Ethernet), unless specified differently.

In the case where the protocol used to transmit the code key message is transported over a layer 2 unicast churned connection (an example—OMCI message), a unicast churning key is used dedicated to the ONT. (It should be noted that the code key message churned by using a unicast churning key must be dechurned at the particular ONT upon receipt). If the code key message itself is protected, the access data may be sent directly to the ONT without extra encryption. In a specific case, when the multicast churning key is directly inserted in the message sent to the ONT, the churning information can be equal to the churning key. If there is no service information in the code key message, VP/VC information is absent,—the access data can be equal to the churning key.

Alternatively, the code key message can be sent through a multicast connection to all ONTs or through a unicast connection or any kind of path shared at the physical layer between several ONTs; in this case the message, the access data comprising the service information and/or the churning key may be encrypted, so as to enable decryption of the access data (for example, of the churning information if the service information is absent) only by the entitled particular ONT. In this case at least three possibilities of encryption are available, which has already been discussed above.

For the second embodiment of the invention, on a new customer request, two cases should preferably be distinguished when determining the churning key:
1. The newly requested multicast stream is already received by at least one other customer on the OLT PON interface (the multicast group comprises at least one member before the new customer joins it);
2. No customer is yet receiving the channel on the IGMP PON interface.

In the first case, the churning information should be determined using the churning key presently being used for the multicast channel churning. In the second case, the OLT should either randomly determine a churning key and then deduct the churning information from it, or use the shared information as the key itself.

As it has been mentioned, the churning information is transported from the OLT to the ONT using a message called the code key message. The method therefore comprises a step of receiving, by the particular end customer, the code key message carrying access data comprising the churning information about a specific churning key used for churning the respective ordered multicast channel, the method terminates with a step of dechurning said channel at the ONT.

The multicast churning key can be periodically refreshed, for example said code key message can be periodically modified and resent to the relevant end customer(s) receiving the suitable multicast channel (members of the multicast group). Still, an auxiliary level of security can be obtained by encrypting the churning information within the code key message.

Preferably, the code key message is transmitted in the form of a PLOAM (Physical Layer Operations Administration and Maintenance)-message of a specific type which will be described in the detailed description. The code key message can be as well transmitted, for example, via a management message, such as an OMCI (ONT Management and Control Interface) message, or by any other protocol/message type. The advantage of the PLOAM message is its real-time capabilities.

For PON supporting ATM (APON, BPON and partly GPON), the access data of the PLOAM code key message may comprise information concerning VP/VC (virtual path and virtual connection indications) in which each of the requested channels can be received. When receiving the code key message including access data with indication of the VP/VC, the ONT may configure both VP and VC, as well as any specific filter to allow the specific channel into the ONT. For GPON, the access data of the code key message may comprise information about a relevant Port-ID (identifying a specific channel/port in which the multicast channel can be found). As has been mentioned above, the access data may comprise additional fields of service information, according to which ONT can be configured to a specific type/format of the multicast service. Finally, using the churning information (if provided in the access data of the code key message), the requested channel is dechurned into the ONT.

Information about the multicast channels respectively allowed for each particular end-customer can be stored as entitlement information. The entitlement information relevant to each of the ONTs can be stored either at the OLT or within any other access control dedicated server interacting directly or indirectly with OLT.

Issuance of the code key message is preferably preceded by comparing the requested channel(s) with the entitlement information, and by checking, for example, the following four criteria:
  Is the subscriber (the end customer) entitled to receive any multicast content?
  Is the subscriber entitled to receive the specific multicast content he/she requested?
  Is the subscriber exceeding the maximum number of authorized simultaneous channels he/she is entitled to receive?
  Is the subscriber exceeding the maximum simultaneous multicast bandwidth (including the control channels bandwidth) he is entitled to receive?

Depending on implementation models, when ordering a new channel, each particular ONT may need to configure its access interface. Whenever the channel is allowed for the customer and bandwidth limitations of the ONT interface are complied with the service requested, the code key message ensures the particular entitled ONT to obtain information enabling it to control/adjust/configure its access to multicast channel(s) delivered by the PON. As has been mentioned, the access data contained in the code key message may comprise: churning information and service information including data about the service type/format transported by the requested channel.

According to yet another aspect of the invention, the object of the invention can be achieved by providing a system for multicast transmission in a PON communication system, capable of implementing the above-described method.

In particular, there are proposed, separately and in combination, an Optical Line Termination (OLT) and An Optical Network Termination (ONT) for the PON.

The inventive Optical Line Termination (OLT) for a PON communication system is provided, capable of performing multicast transmission, using IGMP protocol and an IGMP router, to a plurality of Optical Network Terminations (ONTs) each associated with an IGMP host and serving respective end customers of the PON communication system, the OLT being capable of:
  receiving an IGMP request for a multicast channel from a particular end customer via a particular ONT, and forwarding said IGMP request to the IGMP router;
in case said particular end customer is added to a multicast group by said IGMP router, the OLT being operative to
  deliver information over said multicast channel to the end customers belonging to said multicast group, and
  allow, for said particular end customer, access to the information delivered along said delivered multicast channel in response to said IGMP request by producing and sending a code key message to the particular ONT, wherein the code key message comprises access data intended for said particular ONT and including at least one of the following kinds of data: churning information, service information, and any combination thereof.

According to one embodiment of the OLT, said OLT is capable of checking entitlement of the particular end customer to the requested channel, of churning said multicast channel before delivery by using a multicast churning key; and wherein said access data in the code key message comprises churning information about the churning key, for dechurning said requested multicast channel at the particular ONT.

According to an alternative (or additional) embodiment of the OLT, said access data in the code key message comprises service information for suitable configuring the particular ONT to said multicast channel. The service information preferably comprises fields indicating at least one of the following: service type, traffic type, service priority, data rate, flow ID, maximal latency/jitter, bit error rate.

In both the first and the second embodiments, additional information transported in said IGMP request from said ONT can be used at the OLT for encrypting at least part of the access data. In the second embodiment, the OLT can be capable of producing said churning key using information (additional information) transported in said IGMP request from said ONT.

The code key message, for example, can be a Physical Layer Operations Administration and Maintenance (PLOAM) message.

However, it can be an OMCI message or still a different kind of message sent via control or management channels. In both the first and the second embodiments, the OLT can be adapted for producing and transmitting the code key message using a unicast connection. Preferably, in this case the OLT is capable of utilizing a layer 2 unicast churned connection, and can be adapted to apply a unicast churning key dedicated to a particular ONT.

An inventive Optical Network Termination (ONT) is provided for serving, in association with IGMP host, an end customer in a PON communication system, the ONT being capable of:
  forwarding an IGMP request for a multicast channel from the end customer to an Optical Line Termination (OLT) being in communication with IGMP router,
  receiving information along the requested multicast channel from said OLT,
  receiving a code key message from the OLT and deriving from said message access data intended for said ONT, wherein the access data comprises at least one of the following kinds of data: churning information, service information, or any combination thereof;

ensuring access to the information delivered along the multicast channel in response to the derived access data, for transmitting thereof to the end customer.

In one embodiment of the ONT, it is capable of
receiving the multicast channel in a churned form,
obtaining, from said access data, the churning information about a multicast churning key used for churning said channel, determining said churning key, and
dechurning said multicast channel using the churning key.

In an alternative or additional embodiment, the ONT can be capable of
obtaining, from said access data, the service information concerning said multicast channel;
self-configuring in response to said service information.

The service information specific fields are essentially those mentioned in the description of the method.

In one embodiment, the ONT is capable of receiving the code key message via a layer 2 unicast connection; further preferably, it can be adapted to dechurn the code key message transmission (if previously churned), using a unicast churning key preliminarily known to the ONT.

The IGMP request can be an IGMP version 2 or 3 message of the type "membership report" indicating address of said requested multicast channel. When using the version 3 IGMP message, the ONT may voluntary insert additional information into the message, and if this additional information is used in the OLT for creating the churning key and/or encrypting the access data, this same additional information can be kept in the ONT for further decrypting at least part of the access data and/or (in a particular case) for obtaining the churning key from the churning information.

BRIEF DESCRIPTION OF THE DRAWINGS

The invention will further be described with reference to the following non-limiting drawings, in which:

FIG. 4 is a schematic table illustrating an example of entitlement information stored at OLT.

DETAILED DESCRIPTION OF PREFERRED EMBODIMENTS

Figure 1:
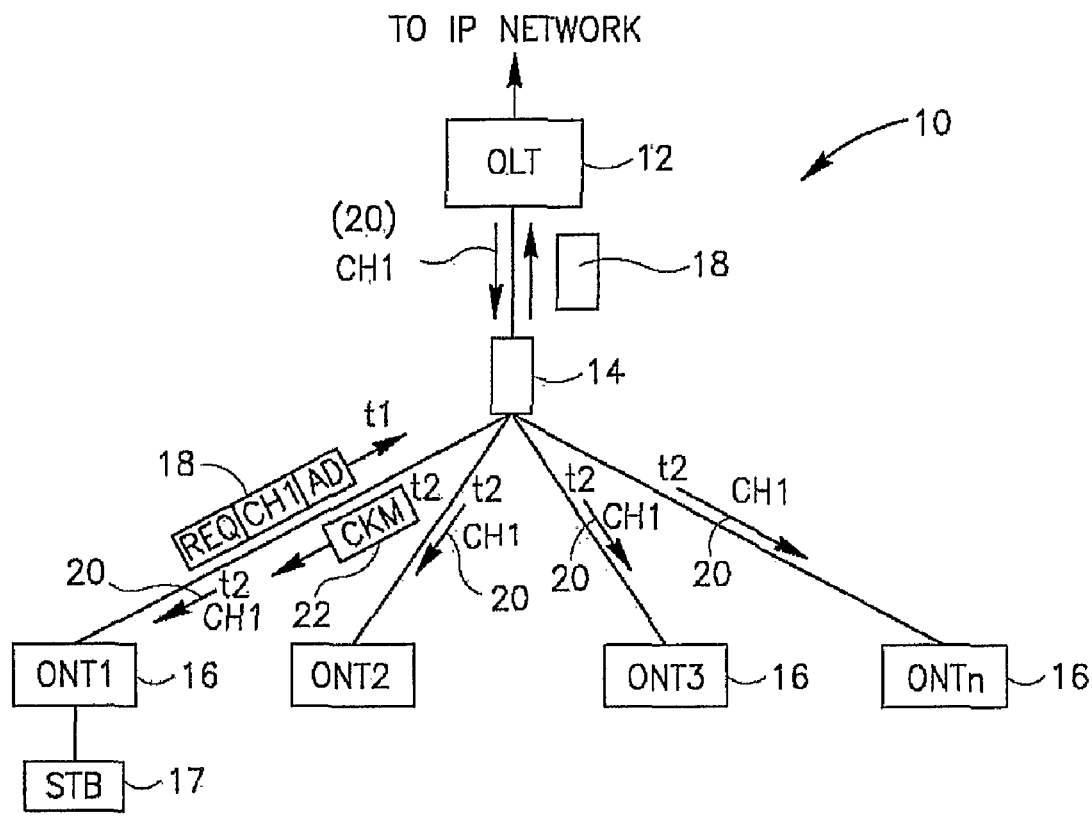
FIG. 1 is a schematic view of a PON comprising an OLT and a number of ONTs illustrating the proposed method.

FIG. 1 illustrates an example of a Passive Optical Network (PON) 10 comprising an Optical Line Termination (OLT) 12 which communicates, for example, with a north-band positioned IP network (not shown), and connected via a passive optical splitter 14 and optical fibers to a plurality of hosts being Optical Network Terminations ONT1 . . . ONTn (generally marked 16). In this particular example, the OLT incorporates an IGMP router. The hosts (shown as ONT blocks) can be also ONUs. FIG. 1 illustrates how the proposed method can be implemented in the PON 10. Suppose an end-user, via an STB 17, orders a new multicast channel (Channel1) from the OLT 12. To this end, ONT1 receiving an IGMP message generated by STB 17, forwards this IGMP version 3 message (request) 18 to OLT 12 at the time t1. In this example, the request comprises indication of the Channel 1 and additional data (AD) selected by ONT and sent to OLT (for encrypting access data and/or for determining a multicast churning key at the OLT). In the specific example shown in FIG. 1, the multicast Channel 1 is delivered from the OLT in a churned form (arrow marked 20). The additional data AD in the IGMP request 18 is used for determining the multicast churning key, which is further used for churning the requested multicast channel at the OLT. OLT receives the IGMP request and analyzes, whether the end-user served by the ONT1 is entitled to the requested channel. If yes, at t2 the OLT 12 transmits the Channel 1 (20) requested by the ONT1, as a churned multicast channel via the point-to-multipoint PON interface to all ONTs of the plurality of ONTs 16. Simultaneously (but possibly, beforehand or after), OLT 12 sends to ONT1 a 'code key message' (CKM) 22. The code key message comprises access information—in this example it includes the churning information calculated at the OLT based on the churning key it selected for use and on the data received from the ONT in the frame of the IGMP request 18. In the present example, the access data of the code key message also comprises service information for adjusting and/or configuring/reconfiguring the ONT PON interface according to that message, namely in response to service/type format information that includes various fields such as service type, traffic type, service priority, flow ID, Data rate and optional VP/VC information (for APON, BPON, and some GPON networks), so as to allow access to the delivered channel. The code key message is preferably protected to allow using it only by the ONT which has ordered the corresponding channel. In this example, the code key message is transported by a PLOAM message. Alternatively, the code key message (over OMCI) can be sent via a multicast channel (common channel shared by all ONTs) or a unicast channel (dedicated to a specific ONT). In the case of unicast transmission, if an ATM connection is used, it should be churned using the classical unicast churning function specified in various PON standards, the code key message is thus protected from being intercepted by other end customers of the PON. If the code key message is transmitted via a multicast (layer 1 or 2) shared channel, an encryption algorithm should be used to encrypt at least the churning key (code key). PLOAM channel can be intercepted by all ONTs, so the churning information, if inserted in the PLOAM message, should preferably be encrypted.

Actually, according to the PON point-to-multipoint principle, all the ONTs from the group 16 might receive the code key message 22. However, only the ONT1 is capable of extracting the relevant key from the code key message; therefore only ONT1 is shown as receiving it.

It should be noted that the code key message is transmitted via a control channel or a management channel, in contrast to the multicast channels transmitted as data traffic.

Upon receiving the code key message 22, ONT1 extracts there-from the access data, then the churning information and obtains the code key for de-churning the received multicast channel.

It should be noted that the multicast Channel 1 could be delivered to the ONT 16 without churning; the access data in the code key message would then comprise only the service information.

Whether the multicast channel is churned or not, the service information may be present in the access data. Upon extracting the service information from the access data, ONT 1 configures itself (if not already configured) for accessing the specified received services and transmitting thereof to the end customer.

Figure 2:
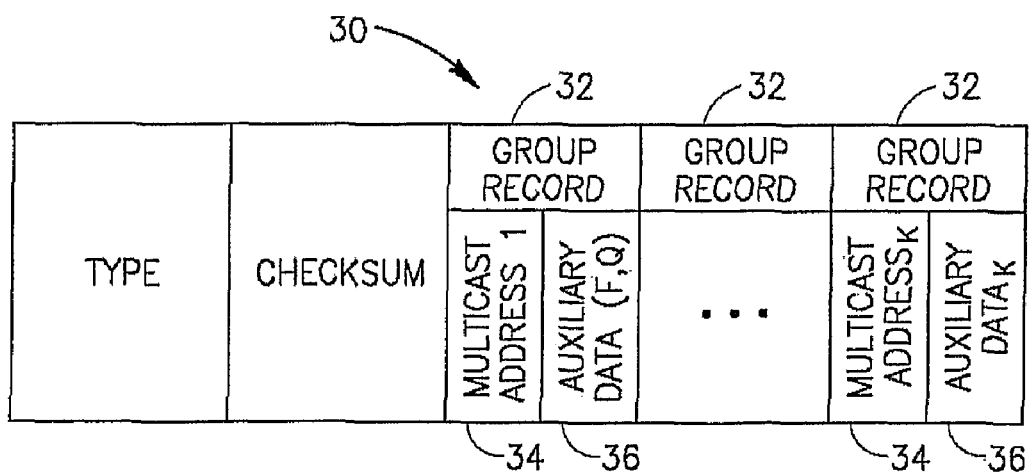
FIG. 2 is an example of a schematic template of the IGMP message (request) with a requested channel and additional information indicated in the message.

FIG. 2 illustrates an exemplary template of an IGMP request message 30, for example a message similar to the IGMP Version 3 of the type "membership report". The format of such a message is proposed, for example, in RFC3376. Alternatively, it can be a similar message of the IGMP version 2, though it does not have some options proposed by version 3. The first portion of the IGMP packet format comprises the message type. In this particular case the type will be the "Membership report" message. The second portion is for a Checksum of the message. The portion relevant to the present invention comprises a number of fields "Group Record" 32, each of the fields 32 comprises a sub-field "Multicast Address" (marked 34) available for indicating address of a requested multicast channel, and a sub-field "Auxiliary data" (36). If a multicast channel is requested by the end customer served by ONT1, the address of the channel is inserted in one of the fields "Multicast Address". In this example of the invention, the IGMP request message 30 carrying the address of the requested channel in one of the sub-fields "Multicast Address" 34 also transports additional information (say, a random number F, or more numbers—F and Q—if length of the sub-field 36 allows) inserted in the corresponding sub-field "Auxiliary Data" 36. The additional information is inserted in the message 40 at the ONT1 requesting the channel, and is stored at the ONT1. This information can be inserted voluntarily and can be immediately used at the OLT for example, a) the number F is used for determining the churning key and/or a so-called churning information from the churning key applied to the requested multicast channel, b) number Q can be used for encrypting the total access data. However, one number is quite enough to serve the both purposes. The churning information will be then transmitted from OLT to the ONT1 in the frame of a code key message (see FIGS. 3A, 3C) for further decrypting it at the ONT1 and dechurning the requested multicast channel. Service information can also be transmitted in the frame of the access data of the code key message (see FIGS. 3A, 3B). As can be seen from the illustrated example, more than one multicast channel can be ordered by the end customer simultaneously, and each of the channels can be accompanied by at least one specific number selected at the ONT1 and inserted in the corresponding sub-field "auxiliary data" in the message 30.

Figure 3A:
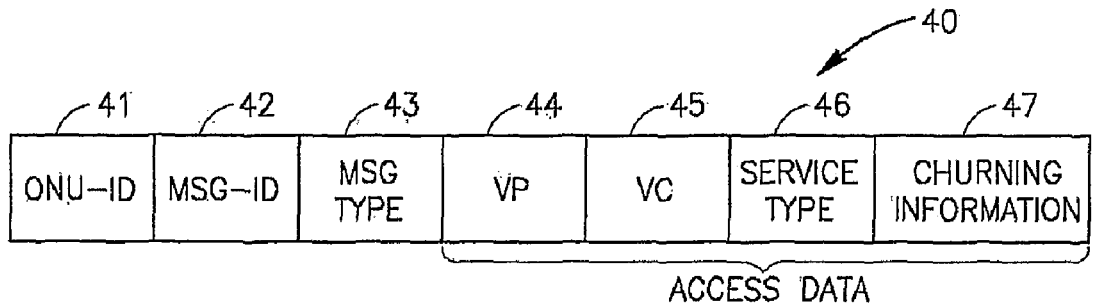
FIGS. 3A, 3B, 3C are non-limiting examples of a schematic template of the "code key" message according to the invention.

FIG. 3A illustrates an exemplary template 40 of a code key message; in this example, it is a PLOAM message (described in ITU-T Recommendations G.983.x) which also serves for configuring a multicast connection in an ATM-based passive optical network (APON, BPON), and also GPON. The exemplary message comprises 12 octets (bytes), which carry the following information. The template comprises a number of sections schematically marked 41-47 and corresponding to specific octets. Section 41 indicates that the message is directed to one specific ONU and gives its identification: the ONU-ID. Section 42 indicates the message ID (in this case, the proposed in the invention "code key message"). Section 43 further defines the message type by indicating whether it configures the multicast VP, or both the multicast VP and VC, or Port-ID. Section 44 points out the multicast VP connection. Section 45 specifies the multicast VC connection. For GPON communication systems, sections 44 and 45 comprise information about ports to be used at the ONU (Port-ID) instead of information concerning VP/VC connections. Section 46 indicates one or more fields of service information, for example the service type of the multicast stream transported by the VP/VC or the port-ID. The service information may require configuring of the ONT according to the multicast service type. Section 47 comprises the churning information concerning the churning key of the requested multicast channel, for obtaining the churning key at the ONT1. The sections 44 to 47 form together the so-called access data.

Figure 3B:
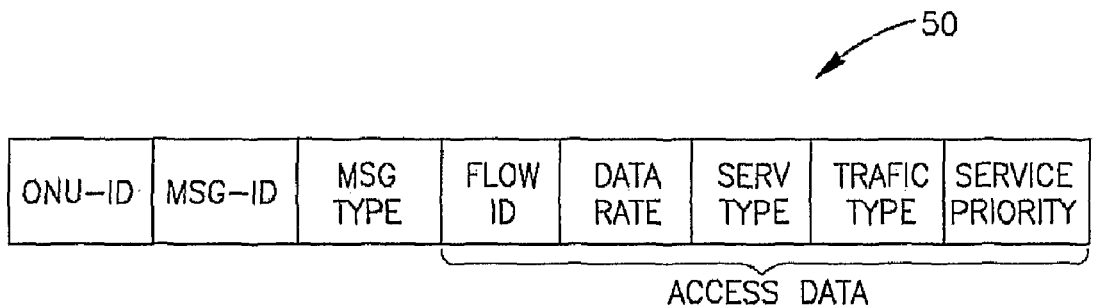

FIG. 3B illustrates another example 50 of the code key message based on the same template as the message 40, and where the access data comprises a combination of some specific fields of service information defining: Flow ID, data rate, the service type of the requested multicast channel, its traffic type, and the service priority in the customer's premises (not shown). The code key message 50 does not comprise any churning information. In this case, the VP and VC fields are absent since the function of channel/flow identification is fulfilled by the field Flow ID.

Figure 3C:
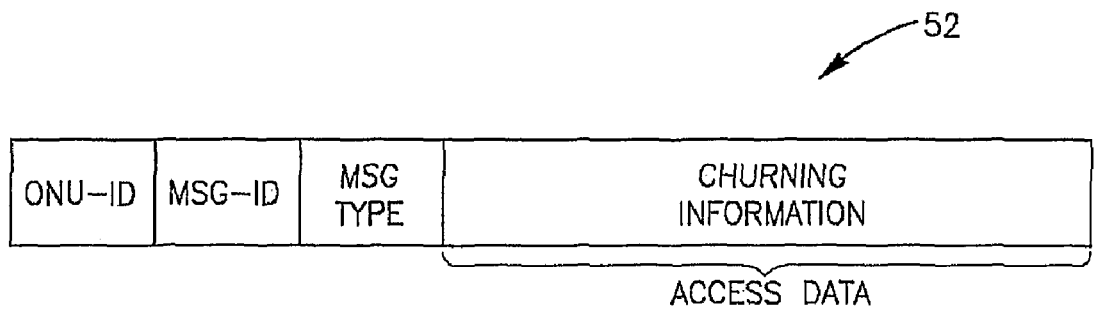

FIG. 3c illustrates yet another example 52 of the code key message where the access data comprises only churning information.

It should be noted that other templates differing from the PLOAM can be used for transporting the code key message.

FIG. 4 illustrates an example of arranging the so-called entitlement information for a group of end customers served by particular ONTs, in a table form 54. It should be noted that the entitlement information can be presented in a different way (say, in a form of tree), and can be stored in an access control server that can be part of either OLT, or other component of the network feeding the OLT. In this case, the relevant entitlement information can be requested from OLT, using a communication protocol. Though in the table 50 each of the customers is associated with a single ONT, it should be noted that an ONT (usually ONU) may serve several customers. For each of the ONTs, the table presents information as to whether the customer served by the ONT is entitled to multicast services. The table specifies which specific channels are entitled channels for the customer; these channels are given as a list of channel numbers. Further, the table presents limitations per customer for a number of simultaneously accessible multicast channels (NOC) and for the maximal allowed bandwidth of simultaneously accessible channels (MaxBW).

Whenever a particular ONT requests a multicast channel, the request is analyzed in the access control server based on the entitlement information presented in table 50.

Figure 5:
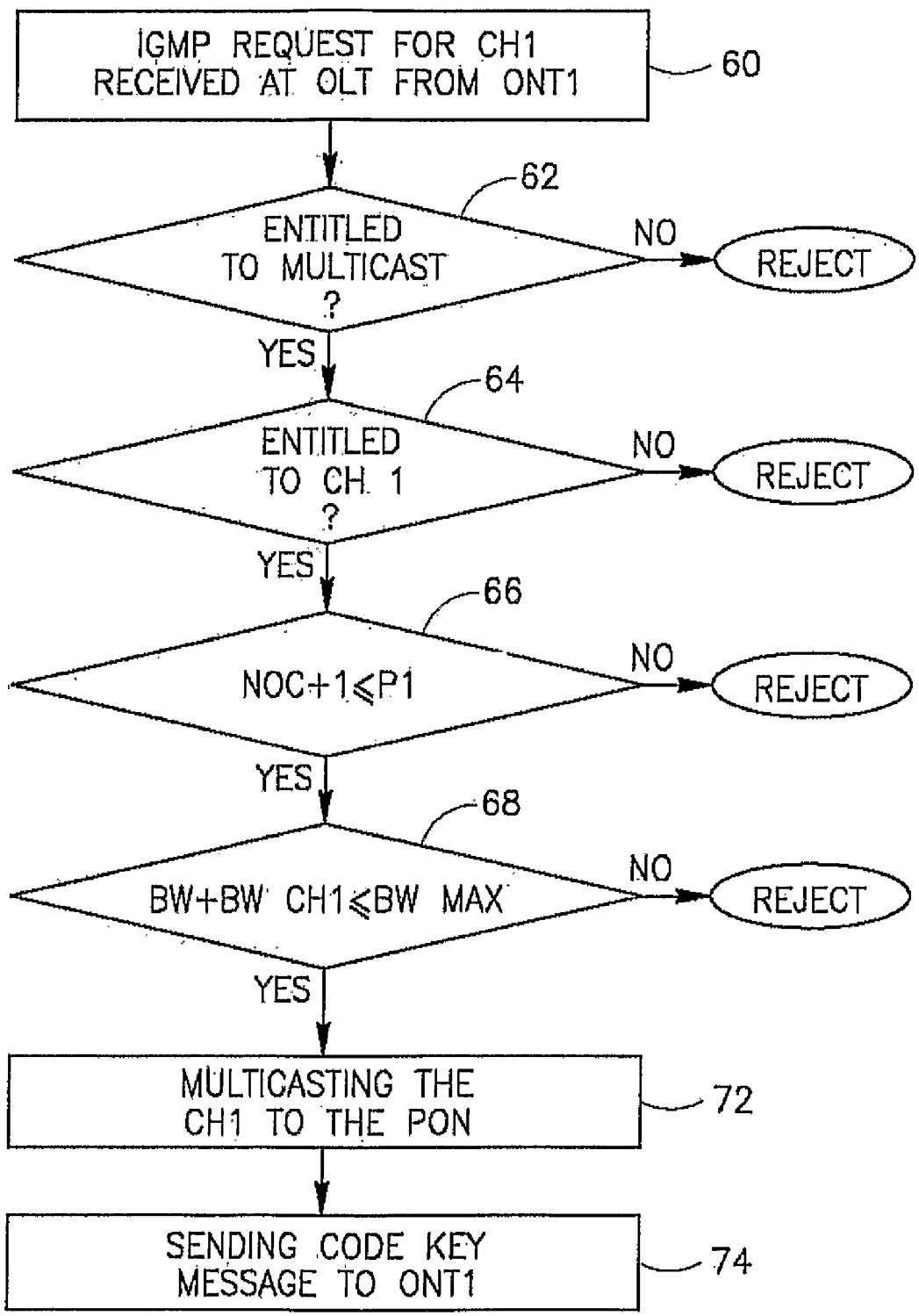
FIG. 5 is a schematic block diagram illustrating check up of entitlement information at OLT upon receiving an IGMP request from ONT.

FIG. 5 illustrates an example of a flow chart explaining some possible versions of the proposed method, including analysis of the customers' requests at OLT and reactions to the requests.

Upon receiving at OLT a request from ONT1 say, in the form of an IGMP message "membership report" indicating the group address of Channel 1, (Block 60), the OLT analyses the entitlement information with respect to the ONT1 end customer information. If the customer is not entitled to any multicast transmission and/or if its not entitled to the specified channel 1, the OLT will reject the request (blocks 62, 64). If the mentioned conditions are satisfied, the OLT further checks whether the present status of the simultaneously transmitted channels and simultaneously used bandwidth allows increasing them for the ordered one additional channel (blocks 66, 68). If the answer is no for any of the latest questions the request is rejected. If the answer is yes for all the previous questions, the requested (possibly churned) Channel 1 is sent from OLT downstream to the PON interface (block 72). Then (or even earlier) the code key message is sent from OLT to the ONT1 (block 74) in order to allow configuring/reconfiguring its interface to access the delivered channel and possibly unscramble it. In this example, the code key message comprises access data containing both the service information and an encrypted churning key in the form of churning information which can be obtained by applying shared information to a churning key selected or produced by OLT. The random number (F) inserted in the sub-field "Auxiliary Data" 36 of the IGMP request 30 and associated with the requested multicast channel can play the part of the shared information.

Figure 6:
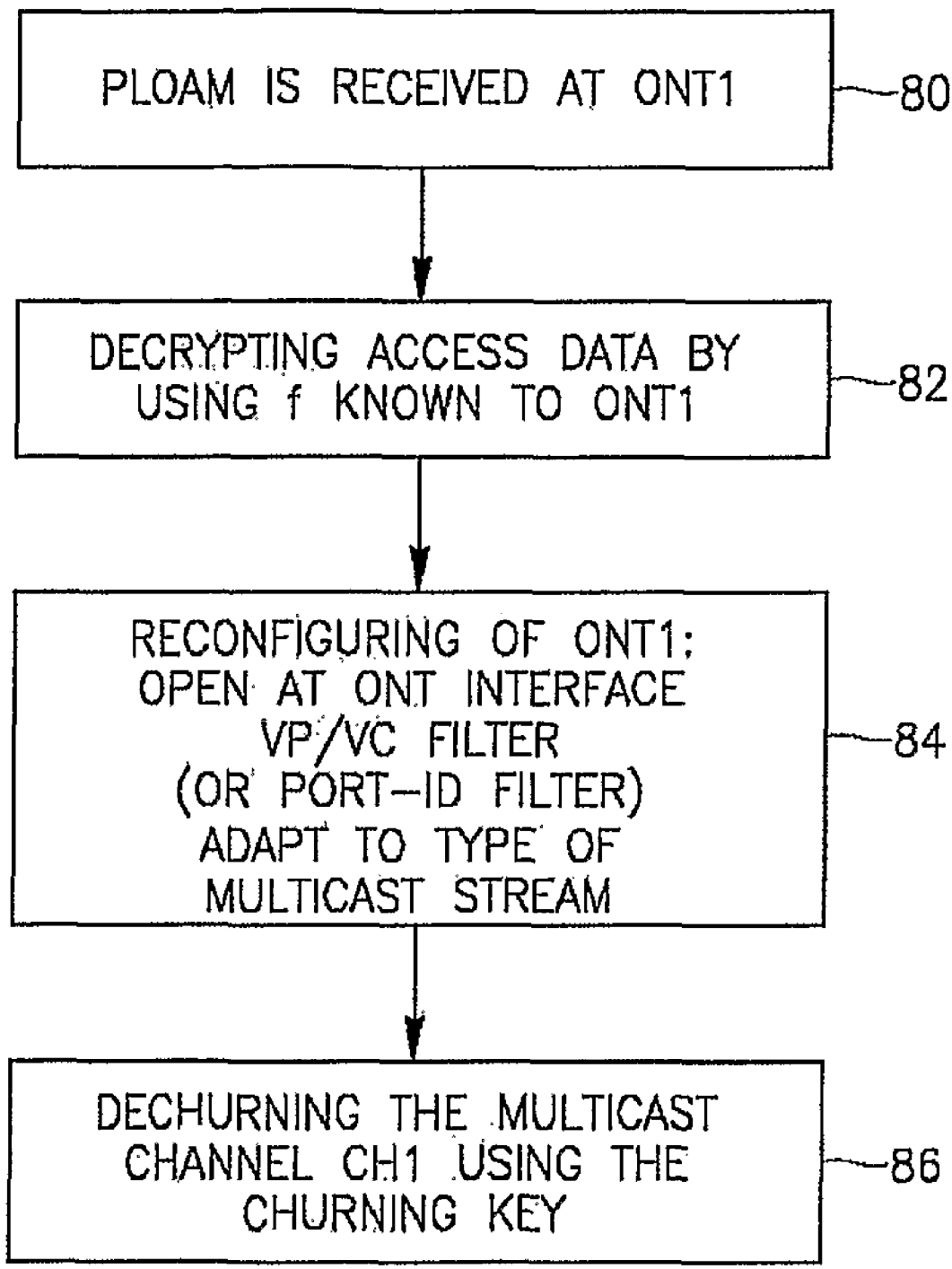
FIG. 6 is a schematic block diagram illustrating an exemplary ONT state machine after reception of the 'code key' message and the churned multicast channel.

FIG. 6 illustrates the decryption process at the ONT1 via which a multicast channel was ordered. In this example, the access data of the code key message comprises both the churning information, and the service information. It is understood that the access data may comprise only one of the mentioned components, and that the access data may be either encrypted or non-encrypted. The exemplary flow chart shown in FIG. 6 comprises Box 80 for receiving code key message (here—a PLOAM message 40) at ONT1, and extracting access data there-from. Box 82 is responsible for decrypting the access data, for example by using a random number F known to both ONT1 and OLT. In this example, the number F is a so-called shared information that has been inserted in the field 36 of the IGMP request 30. However, the shared information must not be always transmitted from the ONT to OLT; it can be formed by or combined from different kinds of data, which just must be known to both the OLT and ONT at a given time. Decryption of the access data comprises decryption of the churning information, if present in the PLOAM message.

It should be noted, however, that the access data may sometimes be sent in the non-encrypted form, then box 82 is absent.

Box 84 of the flow chart initiates reconfiguring the ONT1 in response to the code key message. For example, it is responsible for opening VP/VC filters at the ONT1 interface in case the PON is APON or BPON. For some implementations of GPON, box 84 will detect information about a specified port ID of ONT1 and activate it. If the service information indicating the type/format of the multicast channel has been found in the access data (upon possible decryption in box 81), that fact necessitates adaptation of the ONT1 to the received multicast service, and that is provided as well in the frame of box 84.

Box 86 indicates an operation of de-churning (descrambling) of the multicast channel with the aid of the churning key obtained at box 84.

It should be taken into account that the code key message (in the form of OMCI) can be transmitted to ONT1 via a layer 2 unicast connection which is churned using a unicast churning key. In this case, the flow chart will include a step of dechurning the code key message immediately upon its receipt at the ONT1 (that step is not shown in FIG. 6). The access data may be transmitted non-encrypted in this case, and the flow chart may therefore skip step 82 of decryption of the access data.

In view of the above-described principles and examples, the above-defined technology of access to multicast information in a PON communication system differs from other known technologies in that it proposes granting access to a multicast channel for a particular end customer by a new message (the code key message) issued from OLT to an IGMP host serving the end customer in response to an IGMP request, wherein the message comprises access data for the host, and the access data is preferably encrypted. The channel can be churned using a multicast churning key. The code key message can be churned either. Using these measures separately or in combinations enables the corresponding end customer to join the multicast group having access to the requested channel.

As can be seen, the access control is performed at several layers. The first layer is providing access per request, by sending access data to the particular end customer. The second layer of the access control can be performed by encoding and further decoding the multicast data itself (with the aid of the multicast churning and dechurning). A further layer of the access control can be made by protecting a code key message which carries a key for decoding the ordered channel at the dedicated host; the protection at this layer can be performed by churning the message. Yet an additional security layer can be applied by encrypting the access information inserted in the code key message (in particular, by encrypting the churning key). A security layer, which can be used instead or in addition to sending a churning key to the end customer, is providing this end customer with dedicated service information about service type/format/rate/flow ID, transmitted as part of the code key message. This information can also be encrypted, preferably by encrypting the whole access data.

At the host interface (ONT), the security can be implemented by suitable stages: dechurning the message and/or decrypting the access data in the message, configuring/reconfiguring input filters of the interface in response to the received code key message (for example, in response to the service information), and dechurning (descrambling) the received multicast channel using the obtained churning key.

While the present invention has been described with reference to a limited number of examples, it should be appreciated that other versions and embodiments can be proposed and be considered part of the invention whenever covered by the claims which follow.

The invention claimed is:

1. A method of multicast transmission in a communication passive optical network (PON) by using IGMP protocol, to a plurality of hosts each associated with an IGMP host to serve respective end customers of the communication network, the method comprises:
   using IGMP protocol to request receipt of information along a multicast channel, by a particular end customer,
   adding said particular customer to a multicast group including, upon adding said particular end customer, at least one of the end customers,
   delivering the information along said multicast channel to the end customers belonging to said multicast group, and
   in response to said request, ensuring for said particular end customer access to the information delivered along said multicast channel by transmitting, to said particular end customer, access data including, service information for assisting receipt, by said end customer, of the information delivered along the multicast channel, and
   wherein the step of ensuring the access to the particular end customer comprises sending a code key message from said OLT to the particular ONT in response to said IGMP request, wherein the code key message comprises said service information, and said service information includes one or more information fields selected from among the fields indicating: service type, traffic type, service priority, data rate, flow ID, maximal latency/jitter, bit error rate (BER), port ID.

2. The method according to claim 1, wherein the step of requesting comprises:
   sending an IGMP request from one of the IGMP hosts to an IGMP router which communicates directly or indirectly with an OLT, the IGMP request indicating said requested multicast channel for delivering the information to the particular end customer served by the host, wherein the IGMP request is sent via a particular ONT associated with the particular end customer and with said OLT.

3. The method according to claim 2, wherein the code key message also comprises churning information indicative of a multicast churning key.

4. The method according to claim 3, wherein the code key message is transmitted in the form of a physical layer operations Administration and Maintenance (PLOAM) message or in the form of ONT Management and Control Interface (OMCI) message.

5. The method according to claim 3, wherein said code key message is transmitted through one of the following connection types: through a multicast connection to all ONTs of the multicast group, through a unicast connection shared at physical level between several ONTs, or via a layer 2 unicast connection to said particular ONT.

6. The method according to claim 2, wherein
the delivering step comprises preliminary churning said multicast channel by using a churning key specific for said channel or a group of channels, and
the step of ensuring the access to the particular end customer comprises sending a code key message from said OLT to the particular ONT in response to said IGMP request, the code key message comprising said access data that includes the churning information about the churning key, for dechurning said requested multicast channel at the particular ONT.

7. The method according to claim 6, comprising encrypting at the OLT the churning information using information shared by both the particular ONT and the OLT at a given moment, for further decrypting the churning information at said particular ONT.

8. The method according to claim 2, wherein the IGMP request further comprises an additional information associated with the requested multicast channel, said additional information being inserted in the IGMP request at the particular ONT and sent from the particular ONT to the OLT.

9. The method according to claim 1, wherein said PON is an ATM based PON, and the access data further comprises information concerning VP/VC or information about port-ID, at which the requested multicast channel can be received at the particular end customer.

10. The method according to claim 1, wherein the code key message comprises said service information including an information field indicating port ID at which the requested multicast channel can be received at the particular end customer.

11. An Optical Line Termination (OLT) for a PON communication system, capable of performing multicast transmission, using IGMP protocol and an IGMP router, to a plurality of Optical Network Terminations (ONTs) each associated with an IGMP host and serving respective end customers of the PON communication system, the OLT being capable of:
receiving an IGMP request for a multicast channel from a particular end customer via a particular ONT, and forwarding said IGMP request to the IGMP router;
if said particular end customer is added to a multicast group by said IGMP router, the OLT being operative to
deliver information over said multicast channel to the end customers belonging to said multicast group, and
ensure, for said particular end customer, access to the information delivered over said multicast channel in response to said IGMP request by producing and sending a code key message to the particular ONT,
wherein the code key message comprises access data intended for said ONT and comprising service information for suitable configuring the particular ONT to the requested multicast channel, including one or more information fields selected from among the fields indicating: service type, traffic type, service priority, data rate, flow ID, maximal latency/jitter, bit error rate (BER), port ID.

12. The OLT according to claim 11, capable of performing at least one of the following two operations by using information shared by the OLT and said ONT at a given time: producing a multicast churning key and encrypting a churning information being comprised in said service information.

13. The OLT according to claim 11, wherein said access data in the code key message comprises churning information.

14. The Optical Line Termination (OLT) according to claim 11, being capable of providing the code key message wherein the service information comprises an information field indicating port ID at which the requested multicast channel can be received at the particular end customer.

15. The Optical Network Termination (ONY) according to claim 11, adapted for suitable configuring thereof to the requested multicast channel according to the service information received in the code key message, wherein the service information being port ID.

16. An Optical Network Termination (ONT) for serving, in association with IGMP host, an end customer in a PON communication system, the ONT being capable of:
forwarding an IGMP request for a multicast channel from the end customer to an Optical Line Termination (OLT) being in communication with IGMP router,
receiving information over the requested multicast channel from said OLT,
receiving a code key message from the OLT and deriving there-from access data intended for said ONT, wherein the access data comprises service information including one or more information fields selected from among the fields indicating: service type, traffic type, service priority, data rate, flow ID, maximal latency/jitter, bit error rate (BER), port ID;
ensuring access to the information delivered over said multicast channel in response to the derived access data.

17. The ONT according to claim 16, capable of
receiving the multicast channel in a churned form,
obtaining, from said access data, churning information about a multicast churning key used for churning said channel, determining said churning key, and
dechurning said multicast channel using the churning key.

18. The ONT according to claim 16, operative to obtain, from said access data, the service information concerning said multicast channel, said ONT being configurable in response to contents of at least one of information fields received within the access data and selected from among the fields indicating: service type, traffic type, service priority, data rate, flow ID, maximal latency/jitter, bit error rate (BER), and operative to configure in response to said service information.

* * * * *

UNITED STATES PATENT AND TRADEMARK OFFICE
CERTIFICATE OF CORRECTION

| | | |
|---|---|---|
| PATENT NO. | : 7,924,835 B2 | Page 1 of 1 |
| APPLICATION NO. | : 11/816444 | |
| DATED | : April 12, 2011 | |
| INVENTOR(S) | : Platnic et al. | |

It is certified that error appears in the above-identified patent and that said Letters Patent is hereby corrected as shown below:

Title Page,
At item (75) Inventor, add --Shai Stein, Raanana (IL)--.

Signed and Sealed this
Fourth Day of October, 2011

David J. Kappos
*Director of the United States Patent and Trademark Office*